(12) United States Patent
Wei

(10) Patent No.: US 11,402,552 B2
(45) Date of Patent: Aug. 2, 2022

(54) LENS AND LENS ASSEMBLY

(71) Applicant: AAC Optics Solutions Pte. Ltd., Singapore (SG)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 256 days.

(21) Appl. No.: 16/914,355

(22) Filed: Jun. 27, 2020

(65) Prior Publication Data

US 2020/0408963 A1    Dec. 31, 2020

(51) Int. Cl.
*G02B 3/04* (2006.01)
*G02B 13/00* (2006.01)
*G02B 7/02* (2021.01)

(52) U.S. Cl.
CPC ............... *G02B 3/04* (2013.01); *G02B 7/021* (2013.01); *G02B 13/004* (2013.01)

(58) Field of Classification Search
CPC .. H04N 5/2254; H04N 5/2251; G02B 13/004; G02B 3/04; G02B 7/021; G02B 7/022
See application file for complete search history.

(56) References Cited

U.S. PATENT DOCUMENTS 6,974,236 B2 * 12/2005 Tenmyo ............... F21V 5/045
                                                    362/327
2014/0319707 A1 * 10/2014 Watanabe ........ B29D 11/00009
                                                    425/588
2017/0023762 A1 * 1/2017 Tobita ................ G02B 7/022
2018/0167538 A1 * 6/2018 Wang .................. H05K 1/185
2019/0338915 A1 * 11/2019 Shum ................... F21V 5/048
2020/0310225 A1 * 10/2020 Shirotori ............... G02B 9/62

FOREIGN PATENT DOCUMENTS

| CN | 103969708 A1 | 8/2014 |
| CN | 203761476 U * | 8/2014 |
| JP | 2008241980 A1 | 10/2008 |
| JP | 2011075682 A1 | 4/2011 |

OTHER PUBLICATIONS

1st Office Action dated Jun. 3, 2021 by JPO in related Japanese Patent Application No. 2020-112644 (6 Pages).

* cited by examiner

*Primary Examiner* — Chiawei Chen
(74) *Attorney, Agent, or Firm* — W&G Law Group

(57) ABSTRACT

Provided are a lens and a lens assembly. The lens includes a first surface, a second surface opposite to the first surface, and a connection surface connecting the first surface with the second surface. The connection surface includes a first outer edge surface, a second outer edge surface, and a third outer edge surface. The first to third outer edge surfaces are all inclined towards an optical axis, at least one has an inclination angle larger than or equal to 10° and smaller than 60°, and at least another one has an inclination angle larger than 0° and smaller than 10°. Alternatively, at least one of the first to third outer edge surfaces is parallel to the optical axis, the other two are inclined towards the optical axis and include at least one having an inclination angle larger than or equal to 10° and smaller than 60°.

12 Claims, 6 Drawing Sheets

LENS AND LENS ASSEMBLY

The present invention relates to the field of camera lens technology, and particularly, to a lens and a lens assembly.

BACKGROUND

With the continuous advance in science and technology in recent years, the newly developed electronic devices become more and more intelligent. Not only digital cameras, but portable electronic devices such as tablet computers and mobile phones are equipped with lens assemblies. The lens assembly known in the related art generally includes a lens barrel, lenses received in the lens barrel, etc.

In the related art, plastic lenses is generally manufactured in a mold, and the molded lenses are taken out (demolded) after finishing the curing and shaping, and then assembled into the lens assembly. However, the molded lenses known in the related art usually have poor demolding performance due to their small mold-withdrawing angles.

Therefore, it is urgent to provide a new lens and a new lens assembly to solve the above problems.

SUMMARY

An object of the present invention is to provide a lens and a lens assembly, for facilitating demolding of lens.

The technical solutions of the present invention are described as below.

A lens includes a first surface, a second surface opposite to the first surface, and a connection surface connecting the first surface with the second surface. The connection surface includes a first outer edge surface, a second outer edge surface, and a third outer edge surface that are sequentially arranged from the first surface to the second surface and inclined towards an optical axis, an angle included between the first outer edge surface and the optical axis is a first angle, an angle included between the second outer edge surface and the optical axis is a second angle, an angle included between the third outer edge surface and the optical axis is a third angle, and at least one of the first angle, the second angle and the third angle is larger than or equal to 10° and smaller than 60°, and at least another one is larger than 0° and smaller than 10°.

The present invention has the following beneficial effects. In the lens of the present invention, the entire connection surface is inclined towards the optical axis from the first surface to the second surface, at least one of the first outer edge surface, the second outer edge surface and the third outer edge surface forms a large mold-withdrawing angle with respect to the optical axis, which facilitates the demolding of the molded lens, and at least another one forms a small mold-withdrawing angle with respect to the optical axis, in order to ensure assembling stability.

In an embodiment, both the second angle and the third angle are larger than or equal to 10° and smaller than 60°.

In an embodiment, both the first angle and the third angle are larger than or equal to 10° and smaller than 60°.

In an embodiment, the first angle is larger than the third angle.

A lens includes a first surface, a second surface opposite to the first surface, and a connection surface connecting the first surface with the second surface. The connection surface includes a first outer edge surface, a second outer edge surface, and a third outer edge surface that are sequentially connected from the first surface to the second surface, and one of the first outer edge surface, the second outer edge surface and the third outer edge surface is parallel to an optical axis, and the other two of the first outer edge surface, the second outer edge surface and the third outer edge surface are inclined towards the optical axis from the first surface to the second surface, and at least one of the other two has an inclination angle larger than or equal to 10° and smaller than 60°.

The present invention has the following beneficial effects. In the lens of the present invention, the connection surface is basically inclined towards the optical axis from the first surface to the second surface, and two of the first outer edge surface, the second outer edge surface and the third outer edge surface form same-direction mold-withdrawing angles with respect to the optical axis, and the rest one forms a large mold-withdrawing angle with respect to the optical axis, which facilitates demolding of the molded lens from the mold.

In an embodiment, the second outer edge surface is parallel to the optical axis, an angle included between the first outer edge surface and the optical axis is a first angle, an angle included between the third outer edge surface and the optical axis is a third angle, and the first angle is larger than or equal to 10° and smaller than 60°.

In an embodiment, the first angle is larger than the third angle.

In an embodiment, the first outer edge surface is parallel to the optical axis, an angle included between the second outer edge surface and the optical axis is a second angle, an angle included between the third outer edge surface and the optical axis is a third angle, and the third angle is larger than or equal to 10° and smaller than 60°.

A lens assembly includes a lens barrel including inner walls, and the lens according to the present invention. The inner walls include a first inner wall and a second inner wall that are sequentially arranged stepwise from an image side to an object side. The first surface is an image side surface of the lens, the second surface is an object side surface of the lens, and the connection surface abuts against the inner wall.

The present invention has a following beneficial effect: the lens has good demolding performance, and the performance of the lens will not be affected when the lens is installed in the lens barrel.

In an embodiment, the first outer edge surface or the second outer edge surface abuts against the second inner wall.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

REFERENCE SIGNS 100. lens barrel; 110. first inner wall; 120. second inner wall;
200. lens; 210. image side surface; 220. outer side surface; 230. connection surface; 232. first outer edge surface; 234. second outer edge surface; 236. third outer edge surface;
300. first lens; 400. second lens; 500. third lens; 600. glue dispensing groove.

DESCRIPTION OF EMBODIMENTS

The present invention will be further described with reference to the accompanying drawings and the embodiments.

Embodiment 1

Figure 1:
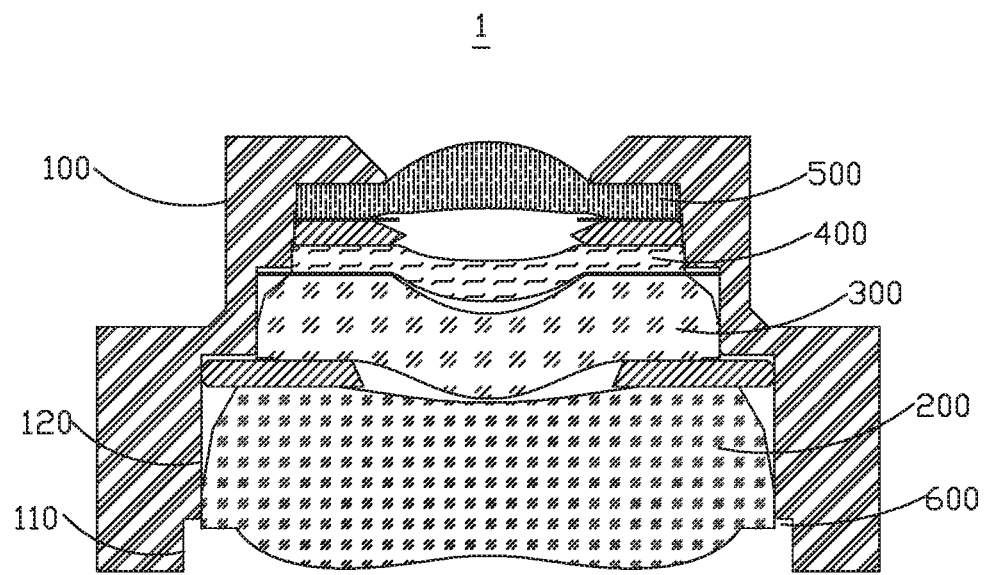
FIG. 1 is a cross-sectional view of a lens assembly of Embodiment 1 of the present invention.
Figure 2:
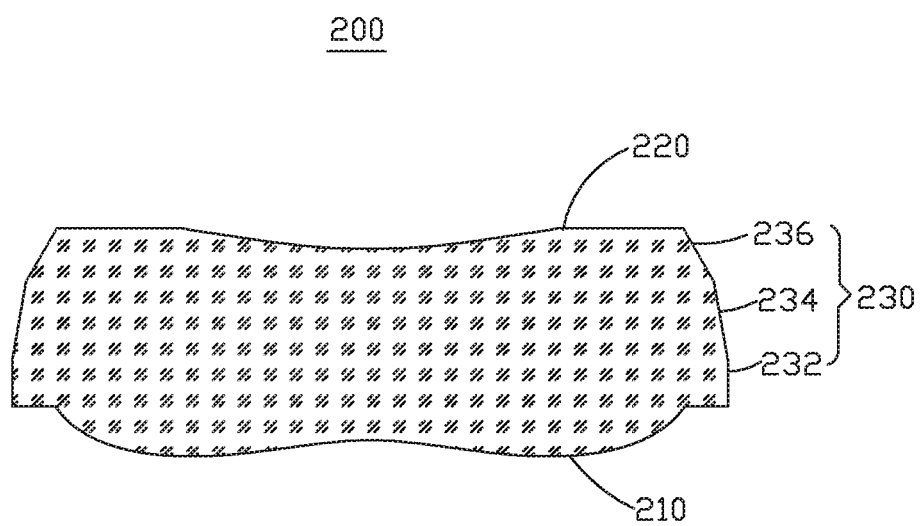
FIG. 2 is a cross-sectional view of a lens of Embodiment 1 of the present invention.

Referring to FIGS. 1 and 2, an embodiment of the present invention provides a lens assembly 1. The lens assembly 1 includes a lens barrel 100, a lens 200, a first lens 300, a second lens 400, and a third lens 500. The lens 200, the first lens 300, the second lens 400, and the third lens 500 are sequentially disposed in the lens barrel 100 from an image side to an object side.

As shown in FIG. 2, the lens 200 includes a first surface 210, a second surface 220, and a connection surface 230 connecting the first surface 210 with the second surface 220. The connection surface 230 is connected to an inner wall of the lens barrel 100. In the present embodiment, the first surface 210 is an image side surface of the lens 200, and the second surface 220 is an object side surface of the lens 200. It can be understood that, in other embodiments, it is also possible that the first surface 210 is the object side surface of the lens 200, and the second surface 220 is the image side surface of the lens 200.

The connection surface 230 includes a first outer edge surface 232, a second outer edge surface 234, and a third outer edge surface 236 that are sequentially connected from the first surface 210 to the second surface 220. One of the first outer edge surface 232, the second outer edge surface 234, and the third outer edge surface 236 is parallel to an optical axis, and the other two are both inclined towards the optical axis in a direction from the first surface 210 towards the second surface 220, and at least one of the two outer edge surfaces inclined with respect to the optical axis has an inclination angle larger than or equal to 10° and smaller than 60°.

In the present embodiment, the first outer edge surface 232 is parallel to the optical axis. When the lens 200 is mounted in the lens barrel 100, the first outer edge surface 232 abuts against the inner wall of the lens barrel 100. The second outer edge surface 234 and the third outer edge surface 236 are inclined with respect to the optical axis, and at least one of the second outer edge surface 234 and the third outer edge surface 236 has an inclination angle larger than or equal to 10° and smaller than 60°.

Compared with the related art, in the lens 200 according to the present embodiment, the connection surface 230 is basically inclined in a direction facing away from the optical axis of the lens 200 from the object side to the image side, both the second outer edge surface 234 and the third outer edge surface 236 can form a mold-withdrawing angle with respect to the optical axis, and at least one of the second outer edge surface 234 and the third outer edge surface 236 forms a larger mold-withdrawing angle with respect to the optical axis, which facilitates the demolding of the molded lens 200. Moreover, a section of the connection surface 230 is a vertical surface, which can ensure a good connection with the inner wall of the lens barrel 100. In addition, the inclination angle of the outer edge surface within the above-mentioned range ensures an easier demolding of the lens 200 and also avoids serious edge defects of the lens 200 due to an excessively large mold-withdrawing angle, which may affect mechanical strength of the lens 200.

For example, an angle included between the second outer edge surface 234 and the optical axis is a second angle, and an angle included between the third outer edge surface 236 and the optical axis is a third angle. At least one of the second angle and the third angle is larger than or equal to 10° and smaller than 60°.

In the present embodiment, the third angle is greater than the second angle, the third angle is equal to 30°, and the second angle is equal to 10°. It is also possible in other embodiments that the third angle is smaller than the second angle, which may be set according to actual requirements.

The second angle and the third angle of the lens 200 of the present embodiment are both large mold-withdrawing angles, and orientations of the mold-withdrawing angles are the same. In this way, the lens 200, which is molded in the mold, can be well demolded. In addition, the third angle is larger than the second angle, in order to gradually remove the lens 200 from the mold during the demolding process.

As shown in FIG. 1, in the present embodiment, the lens barrel 100 includes a first inner wall 110 and a second inner wall 120 that are sequentially arranged stepwise from the image side to the object side. The first outer edge surface 232 abuts against the second inner wall 120, and a glue-dispensing groove 600 is formed between a portion of the first outer edge surface 232 and the first inner wall 110, such that glue can be added into the glue-dispensing groove 600 to fix the lens 200.

It can be understood that, in order to improve the demolding performance of the other lenses in the lens assembly, the first lens 300, the second lens 400, or the third lens 500 may have an outer peripheral surface that is configured in the similar manner as the connection surface 230 of the lens 200 according to the present embodiment.

Embodiment 2

Figure 3:
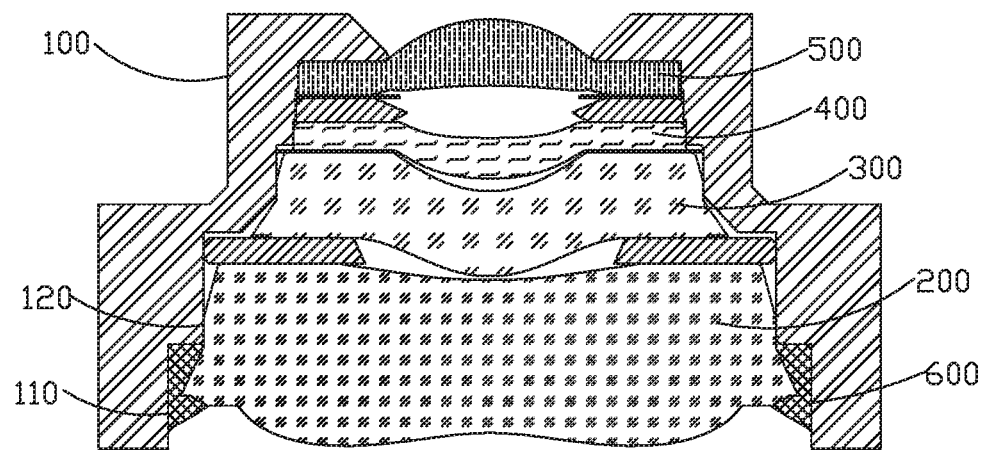
FIG. 3 is a cross-sectional view of a lens assembly of Embodiment 2 of the present invention.
Figure 4:
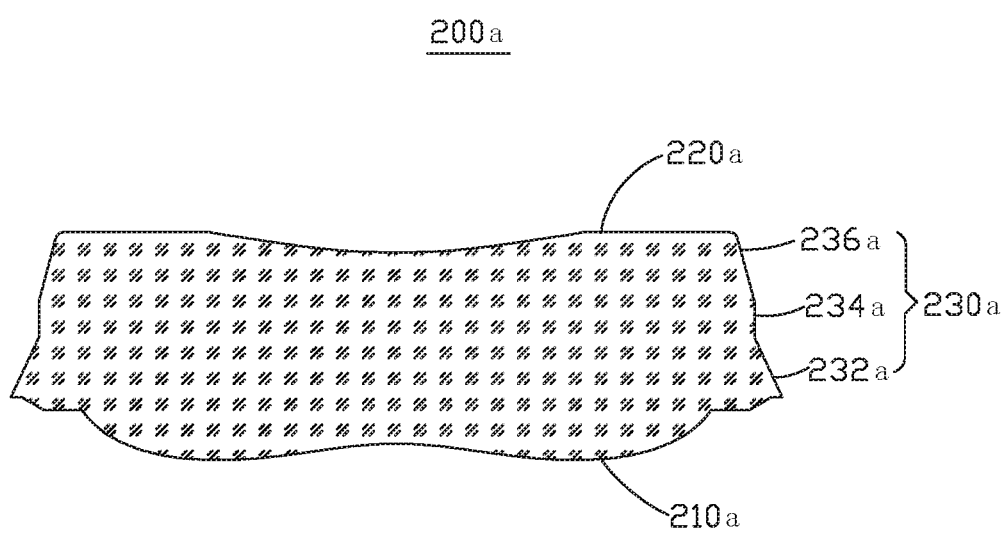
FIG. 4 is a cross-sectional view of a lens of Embodiment 2 of the present invention.

Referring to FIG. 3 and FIG. 4, Embodiment 2 differs from Embodiment 1 of the present invention in that the second outer edge surface 234a is parallel to the optical axis, and both the first outer edge surface 232a and the third outer edge surface 236a are inclined towards the optical axis of the lens 200a from the image side to the object side. An angle included between the first outer edge surface 232a and the optical axis is a first angle, an angle included between the third outer edge surface 236a and the optical axis is a third angle, and at least one of the first angle and the third angle is larger than or equal to 10° and smaller than 60°.

In the present embodiment, the first angle is larger than the third angle, the first angle is equal to 25°, and the third angle is equal to 15°. It is possible in other embodiments that the first angle is smaller than or equal to the third angle, which can be specifically set according to actual needs.

In the present embodiment, the second outer edge surface 234a abuts against the second inner wall 120 of the lens barrel 100; and the first outer edge surface 232a, a portion of the image side surface 210a and the first inner wall 110 are enclosed to form a glue-dispensing groove 600. Moreover, since the first outer edge surface 232a of the lens 200a is inclined outwardly in a radial direction of the lens, a contact area between the glue and the lens 200a is larger, which increases reliability of the dispensed glue.

Embodiment 3

Embodiment 3 differs from Embodiment 1 of the present invention in that the third outer edge surface 236 is parallel to the optical axis, and both the first outer edge surface 232 and the second outer edge surface 234 are inclined towards the optical axis of the lens 200 from the image side to the object side. The angle included between the first outer edge surface and the optical axis is a first angle, the angle included between the second outer edge surface and the optical axis is a second angle, and at least one of the first angle and the second angle is larger than or equal to 10° and smaller than 60°.

In the present embodiment, the third outer edge surface 234 abuts against the second inner wall 120 of the lens barrel 100; and the first outer edge surface 232, the second outer edge surface 234 and the first inner wall 110 are enclosed to form a glue-dispensing groove 600. Moreover, since the first outer edge surface 232 and the second outer edge surface 234 of the lens 200 are inclined outwardly in the radial direction of the lens, the contact area between the glue and the lens 200 is larger, which increases the reliability of the dispensed glue.

Embodiment 4

Figure 5:
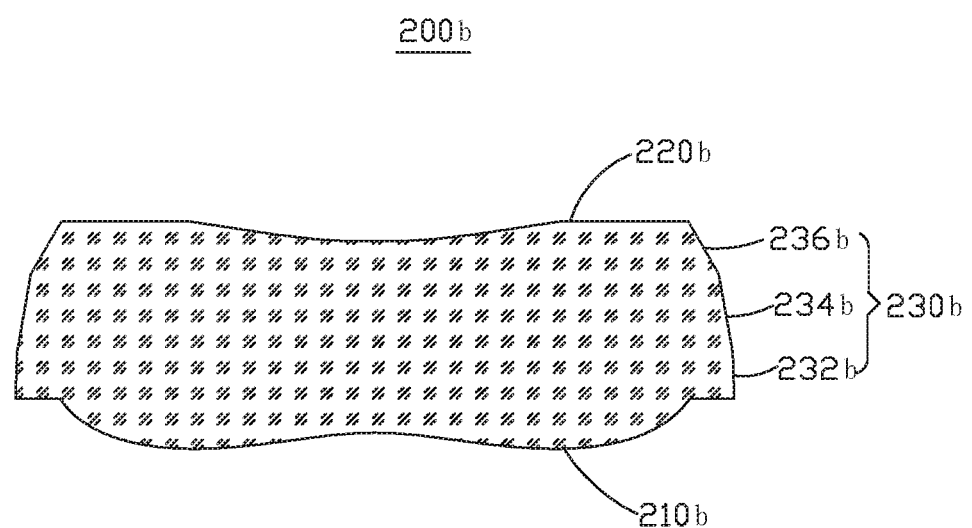
FIG. 5 is a cross-sectional view of a lens of Embodiment 4 of the present invention.

Referring to FIG. 5, Embodiment 4 of the present invention differs from Embodiment 1 in that the connection surface 230b includes a first outer edge surface 232b, a second outer edge surface 234b and a third outer edge surface 236b that are inclined towards the optical axis from the first surface 210b to the second surface 220b. An angle included between the first outer edge surface 232b and the optical axis is a first angle, an angle included between the second outer edge surface 234b and the optical axis is a second angle, an angle included between the third outer edge surface 236b and the optical axis is a third angle. At least one of the first angle, the second angle and the third angle is larger than or equal to 10° and smaller than 60°, and at least another one is larger than 0° and smaller than 10°.

Compared with the related art, in the lens 200b according to the present embodiment, the entire connection surface 230b is basically inclined towards the optical axis of the lens 200b from the first surface 210b to the second surface 220b, and at least one of the first outer edge surface 232b, the second outer edge surface 234b and the third outer edge surface 236b forms a large mold-withdrawing angle with respect to the optical axis, thereby facilitating the demolding of the molded lens 200b, and at least another one thereof forms a small mold-withdrawing angle with respect to the optical axis, in order to ensure assembling stability.

When the lens 200b is mounted in the lens barrel 100 of the lens assembly 1, the outer edge surface corresponding to the smallest inclination angle is attached to the inner wall of the lens barrel 100.

In the present embodiment, the first angle is the smallest, and in this case, the first outer edge surface 232b is attached to the inner wall of the lens barrel 100. The first angle is larger than 0° and smaller than 10°, and a mold-withdrawing angle is formed between the first outer edge surface 232 and the optical axis; both the second angle and the third angle are larger than or equal to 10° and smaller than 60°, and thus the second outer edge surface 234b and the third outer edge surface 236b can each form a large mold-withdrawing angle with respect to the optical axis.

In the present embodiment, the first angle is 5°, the third angle is larger than the second angle, the second angle is 10°, and the third angle is 30°. It is possible in other embodiments that the third angle is smaller than or equal to the second angle, which can be specifically set according to actual requirements.

Embodiment 5

Figure 6:
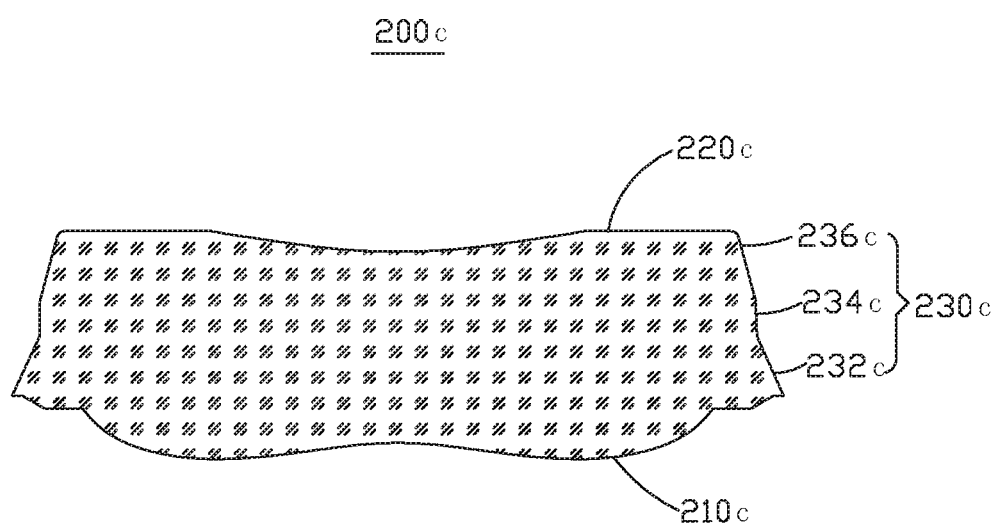
FIG. 6 is a cross-sectional view of a lens of Embodiment 5 of the present invention.

Referring to FIG. 6, Embodiment 5 differs from Embodiment 4 of the present invention in that, in the present embodiment, the second angle is the smallest, and thus the second outer edge surface 234c is attached to the inner wall of the lens barrel 100. The second angle is larger than 0° and smaller than 10°, and a small mold-withdrawing angle is formed between the second outer edge surface 234c and the optical axis; both the first angle and the third angle are larger than or equal to 10° and smaller than 60°, and thus the first outer edge surface 232c and the third outer edge surface 236c can each form a large mold-withdrawing angle with respect to the optical axis.

In the present embodiment, the second angle is 5°, the first angle is larger than the third angle, the first angle is equal to 25°, and the third angle is equal to 15°. It is possible in other embodiments that the first angle is smaller than or equal to the third angle, which can be specifically set according to actual requirements.

It can be understood that, in other embodiments, the third angle may be the smallest angle, and thus a small mold-withdrawing angle is formed between the third outer edge surface 236c and the optical axis; and the first outer edge surface 232 and the second outer edge surface 234c can each form a large mold-withdrawing angle with respect to the optical axis, which can be set according to specific requirement.

It should be noted that, the above are merely preferred embodiments of the present invention, and the modifications made by those skilled in the art without departing from the inventive concept of the present invention shall fall within the protection scope of the present invention.

What is claimed is:

1. A lens, comprising:
   a first surface;
   a second surface arranged opposite to the first surface; and
   a connection surface connecting the first surface with the second surface,
   wherein the connection surface comprises a first outer edge surface, a second outer edge surface, and a third outer edge surface that are sequentially arranged from the first surface to the second surface and inclined towards an optical axis, an angle included between the first outer edge surface and the optical axis is a first angle, an angle included between the second outer edge surface and the optical axis is a second angle, an angle included between the third outer edge surface and the optical axis is a third angle, and at least one of the first angle, the second angle and the third angle is larger than or equal to 10° and smaller than 60°, and at least another one is larger than 0° and smaller than 10°.

2. The lens as described in claim 1, wherein both the second angle and the third angle are larger than or equal to 10° and smaller than 60°.

3. The lens as described in claim 1, wherein both the first angle and the third angle are larger than or equal to 10° and smaller than 60°.

4. The lens as described in claim 3, wherein the first angle is larger than the third angle.

5. A lens assembly, comprising:
   a lens barrel comprising inner walls, wherein the inner walls comprise a first inner wall and a second inner wall that are sequentially arranged stepwise from an image side to an object side; and
   the lens as described in claim 1,
   wherein the first surface is an image side surface of the lens, the second surface is an object side surface of the lens, and the connection surface abuts against the inner wall.

6. The lens assembly as described in claim 5, wherein the first outer edge surface or the second outer edge surface abuts against the second inner wall.

7. A lens, comprising:
   a first surface;
   a second surface opposite to the first surface; and
   a connection surface connecting the first surface with the second surface,
   wherein the connection surface comprises a first outer edge surface, a second outer edge surface, and a third outer edge surface that are sequentially connected from the first surface to the second surface, and one of the first outer edge surface, the second outer edge surface and the third outer edge surface is parallel to an optical axis, and the other two of the first outer edge surface, the second outer edge surface and the third outer edge surface are inclined towards the optical axis from the first surface to the second surface, and at least one of the other two has an inclination angle larger than or equal to 10° and smaller than 60°.

8. The lens as described in claim 7, wherein the second outer edge surface is parallel to the optical axis, an angle included between the first outer edge surface and the optical axis is a first angle, an angle included between the third outer edge surface and the optical axis is a third angle, and the first angle is larger than or equal to 10° and smaller than 60°.

9. The lens as described in claim 8, wherein the first angle is larger than the third angle.

10. The lens as described in claim 7, wherein the first outer edge surface is parallel to the optical axis, an angle included between the second outer edge surface and the optical axis is a second angle, an angle included between the third outer edge surface and the optical axis is a third angle, and the third angle is larger than or equal to 10° and smaller than 60°.

11. A lens assembly, comprising:
    a lens barrel comprising inner walls, wherein the inner walls comprise a first inner wall and a second inner wall that are sequentially arranged stepwise from an image side to an object side; and
    the lens as described in claim 7,
    wherein the first surface is an image side surface of the lens, the second surface is an object side surface of the lens, and the connection surface abuts against the inner wall.

12. The lens assembly as described in claim 11, wherein the first outer edge surface or the second outer edge surface abuts against the second inner wall.

* * * * *